United States Patent Office 3,776,906
Patented Dec. 4, 1973

3,776,906
7-[D-(α-AMINO-α-PHENYL-, 2-THIENYL- AND 3-THIENYL-ACETAMIDO)] - 3 - (1,2,5 - THIADI-AZOL - 3 - YL)CARBONYLTHIOMETHYL - 3-CEPHEM-4-CARBOXYLIC ACIDS
John Michael Essery and Lee Cannon Cheney, Fayetteville, N.Y., assignors to Bristol-Myers Company, New York, N.Y.
No Drawing. Filed Mar. 16, 1972, Ser. No. 235,323
Int. Cl. C07d 99/24
U.S. Cl. 260—243 C                   44 Claims

ABSTRACT OF THE DISCLOSURE

7[D-(α-amino-α-phenyl-, 2-thienyl- and 3-thienyl-acetamido)]-3-(1,2,5-triadiazol - 3 - yl)carbonylthiomethyl-3-cephem-4-carboxylic acids and their nontoxic, pharmaceutically acceptable salts are valuable as antibacterial agents, as nutritional supplements in animal feeds, as agents for the treatment of mastitis in cattle and as therapeutic agents in poultry and animals, including man, and are specially useful in the treatment, particularly by oral administration, of infectious diseases caused by many Gram-positive and Gram-negative bacteria. Also included in this invention are the corresponding pivaloyloxymethyl, acetoxymethyl, methoxymethyl, acetonyl and phenacyl esters of such acids and their nontoxic, pharmaceutically acceptable acid addition salts.

BACKGROUND OF THE INVENTION

(1) Field of the invention

The cephalosporins of the present invention possess the usual attributes of such compounds and are particularly useful in the treatment of bacterial infections by oral administration.

(2) Description of the prior art (A) Cephalosporins in general.—Cephalothin and cephaloridine are well-known antibacterial agents; see U.S. Pats. 3,218,318; 3,449,338 and 3,498,979. The literature also contains considerable data on the activity of cephaloglycin and cephalexin; see U.S. Pats. 3,303,193, 3,507,861 and 3,560,489 and Great Britain 985,747 and 1,054,806. Newer cephalosporins include cefazolin and cephapirin; see U.S. Pat. 3,516,997 [and also Netherlands 6805179 (Farmdoc 34,328) and South Africa 68/4,513] and U.S. Pat. 3,422,100.

The literature on cephalosphorins has been reviewed by E. P. Abraham, Quart. Rev. (London), 21, 231 (1967) by E. Van Heyningen, Advan. Drug Res., 4, 1–7 (1967) and briefly in Annual Reports in Medicinal Chemistry, Academic Press, Inc., 111 5th Ave., New York, N.Y. 10003, by L. C. Cheney on pp. 96 and 97 (1967) and by K. Gerzon and R. B. Morin on pp. 90–93 (1968) and by Gerzon on pp. 79–80 (1969) and by L. H. Conover on pp. 101–102 (1970). New cephalosporins are frequently reported at the annual Interscience Conference on Antimicrobial Agents and Chemotherapy as illustrated by Gassiver et al., Antimicrobial Agents and Chemotherapy—1968, American Society for Microbiology, Bethesda, Md., pp. 101–114 (1969) and by Nishida et al., ibid., 236–243 (1970). Two excellent reviews are The Cephalosporins; Microbiological, Chemical and Pharmacological Properties and Use in Chemotherapy of Infection, L. Weinstein and K. Kaplan, Annals of Internal Medicine, 72, 729–739 (1970) and Structure Activity Relationships Among Semi-synthetic Cephalosporins, M. L. Sassiver and A. Lewis, Advances in Applied Microbiology, edited by D. Perlman, 13, 163–236 (1970), Academic Press, New York. Two more recent reviews are β-Lactam Antibiotics: Their Physiochemical Properties and Biological Activities in Relation to Structure, J. P. Hou and J. W. Poole, J. Pharmaceutical Sciences, 60(4), 503–532 (April 1971) and Chemistry of Cephalosporin Antibiotics, R. B. Morin and B. G. Jackson, Fortschr. Chem. Org. Naturst., 28, 343–403 (1970) which includes a section on nucleophilic displacement of the acetate group at pp. 370–373.

The preparation of various 7-[α-amino-arylacetamido]-cephalosporanic acids and the corresponding desacetoxy compounds in which aryl represents unsubstiuted or substituted phenyl or 2- or 3-thienyl is described, for example, in British specifications 985,747, 1,017,624, 1,054,806 and 1,123,333, in Belgium Pat. 696,026 (Farmdoc No. 29,494), in U.S. Pats. 3,311,621, 3,352,858, 3,498,750, 3,489,751, 3,489,752, 3,518,260 and 3,575,969, in Japanese Pat. 16,871/66 (Farmdoc 23,231), by Spencer et al., J. Med. Chem., 9(5), 746–750 (1966), by Ryan et al., J. Med. Chem., 12, 310–313 (1969) and by Kurita et al., J. Antibiotics (Tokyo) (A), 19, 243–249 (1966) and see also U.S. Pat. 3,485,819. British specification 1,073,530 includes a disclosure of the preparation of such compounds by acylation of sililyated 7-ACA.

Netherlands Pats. 6811676 (Farmdoc 36,349) and 6812382 (Farmdoc 36,496) and U.S. Pats. 3,489,750 and 3,489,751 disclose ring-substituted cephaloglycins.

(B) 3 - thiomethylcephalosporins.—Various cephalosporins, including cephalosporin C on occasion but not cephaloglycin, have been reacted with nucleophilic, aromatic mercaptans to produce compounds having the structure

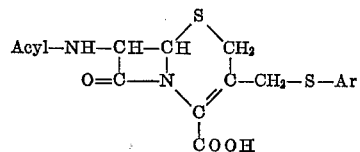

In U.S. Pat. 3,278,531 Ar is phenyl or certain substituted phenyls or certain aromatic heterocyclic rings named, for example, in col. 5. Similar nucleophiles, e.g. 2-mercaptopyrimidines, are disclosed in U.S. 3,261,832 and Great Britain 1,101,422 and U.S. 3,479,350 and U.S. 3,502,665, all issued to Glaxo. A parallel disclosure is found in Great Britain 1,109,525 to Ciba, e.g. in definition "h" for R₃. Additional nucleophiles of this type were disclosed by Fujisawa in Belgian 714,518 (Farmdoc 35,307; Netherlands 6806129 and South African 68/2,695), in Canadian 818,501 (Farmdoc 38,845), in Great Britain 1,187,323 (Farmdoc 31,936; Netherlands 671488), in U.S. 3,530,-123 and in U.S. 3,516,997 (Farmdoc 34,328; Netherlands 6805179) which includes the compound named cefazolin, which has a tetrazolylacetyl side chain on the 7-amino group and a 5-methyl-thiadiazolylthiomethyl group at the 3-position and is described at some length in the scientific literature, e.g. in Antimicrobial Agents and Chemotherapy—1969, American Society for Microbiology, Bethesda, Md., at pp. 236–243, and in J. Antibiotics (Japan), 23(3), 1931–148 (1970).

Replacement of the 3-acetoxy group of a cephalosporin by various heterocyclic thiols has been disclosed in U.S. 3,563,983 and in Netherlands 7005519 (Farmdoc 80,-188R) where the sidechains were, for example, 7-α-aminophenylacetamido and typical heterocyclic thiols were 2-methyl-1,3,4-thiadiazole-5-thiol and 1-methyl-1,2,3,4-tetrazole-5-thiol.

Various cephalosporins having the structure

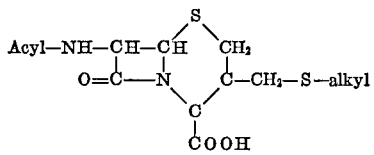

in which acyl represents various sidechains including α-aminophenylacetyl have been described in some of the above and by Glaxo in Belgian 734,532 (Farmdoc 41,-619) and in Belgian 734,533 (Farmdoc 41,620) and by Lilly in Belgian 743,754 (Farmdoc 41,150R).

Cephalosporins having the structure

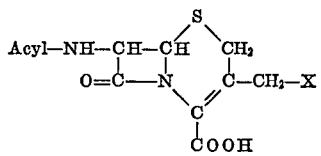

where X includes

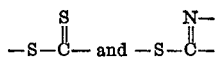

are disclosed in many patents including some of the above and in U.S. 3,239,516, 3,239,515, 3,243,435, 3,258,461, 3,431,259, 3,446,803, 3,278,531, 3,261,832 and 3,573,-298.

Related publications in the scientific literature include J. Med. Chem. 8, 174–181 (1965) and J. Chem. Soc. (London), 1595–1605 (1965), 5015–5031 (1965) and 1959–1963 (1967).

(C) 3-acylthiomethylcephalosporins.—The following publications and patents disclose certain additional 7-ACA derivatives containing a 3-acylthiomethyl moiety (in which phenyl is abbreviated as Ph):

(1) G. F. H. Green, J. E. Page, and S. E. Staniforth, J. Chem. Soc., 1595–605 (1965). This reference gives the proton magnetic resonance spectra of the 3-benzoylthiomethyl derivative of cephalothin.

Cocker et al., J. Chem. Soc., 1142–1151 (1966) adds thiopicolinyl and references Belgian 650,444.

(2) J. D. Cocker et al., J. Chem. Soc., 5015–31 (1965) discloses compounds having the structure

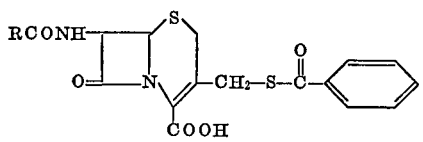

wherein R has the following meanings:

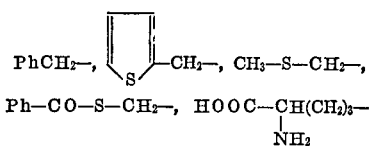

(3) Glaxo's U.S. 3,261,832 discloses compounds having the structure

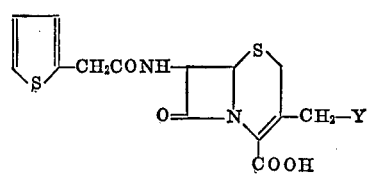

wherein Y has, for example, the following meanings:

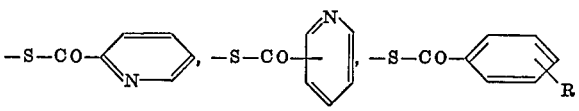

where R is

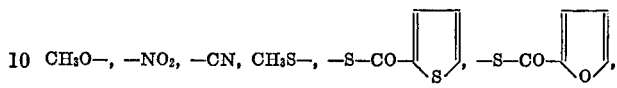

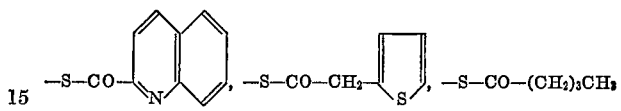

Equivalents are Netherlands 6408066 (Farmdoc 15,534) and Great Britain 1,101,424.

(4) Glaxo's Netherlands 6506818 (Farmdoc 19,306) discloses the reaction

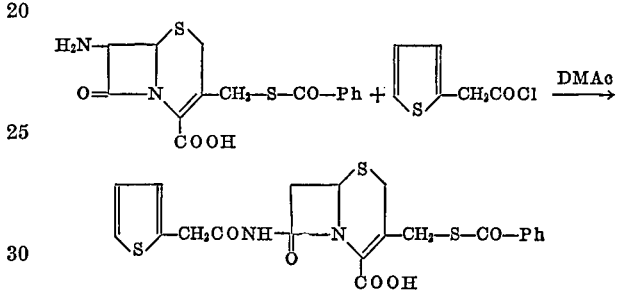

An equivalent is U.S. 3,502,665.

(5) Glaxo's Netherlands 6411521 [Chem. Abstr., 63:13281d (1965)] discloses the reaction

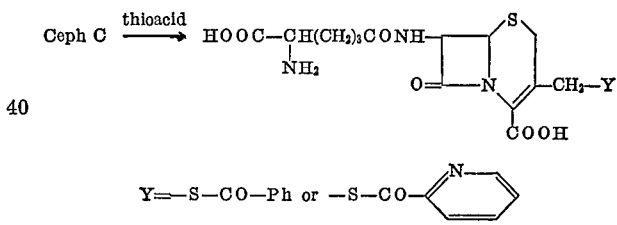

wherein

Equivalents are Great Britain 1,101,422 and Canadian 796,747 (Farmdoc 17,362).

(6) Ciba's U.S. 3,555,017 discloses compounds having the structure

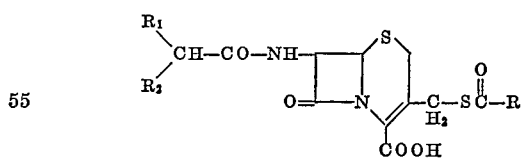

$R_1$ and $R_2$=halogen.

As usual in Ciba's patents directed primarily to novel sidechains at the 7-position, the R group above is defined broadly as the residue of a carboxylic acid and may be illustrated by phenyl, as the residue of thiobenzoic acid. Equivalents are Belgian 708,241 (Farmdoc 33,276), Great Britain 1,211,747 and French 1,575,554.

(7) Ciba's British 1,211,718 discloses compounds having the structure

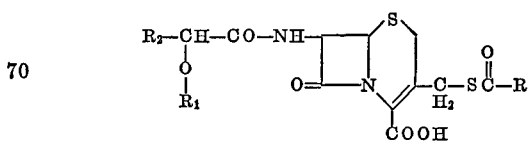

R as in (6) above. Equivalents are Belgian 708,311 (Farmdoc 33,277) and U.S. 3,557,104.

(8) Ciba's Belgian 751,526 (Farmdoc 90,178R) discloses compounds having the structure

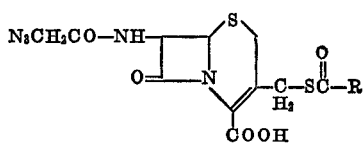

R as in (6) above. An equivalent is Netherlands 7008237.

(9) Ciba's South African 69/8,436 discloses compounds having the structure

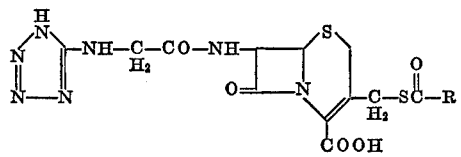

R as in (6) above. Equivalents are Belgian 743,014 (Farmdoc 43,126R) and Netherlands 6918611.

(10) Ciba's South African 69/8,399 discloses compounds having the structure

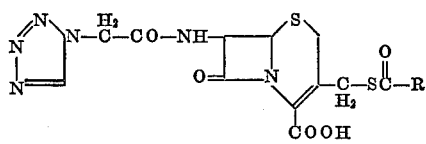

R as in (6) above. Equivalents are Belgian 742,933 (Farmdoc 41,568R) and Netherlands 6918531.

(11) Ciba's South African 68/8,185 discloses compounds having the structure

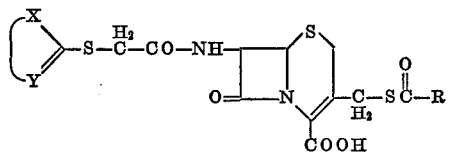

R as in (6) above. An equivalent is Netherlands 6818868 (Farmdoc 38,504).

(12) Ciba's Netherlands 6818868 (Farmdoc 38,505) discloses compounds having the structure

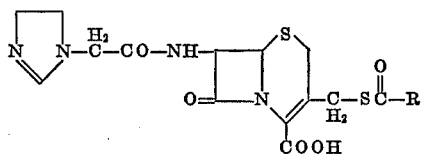

R as in (6) above. Equivalents are South African 68/8,120, German 1,817,121 and Belgian 726,316.

(13) Fujisawa's Great Britain 1,187,323, for example, at 5, lines 67-71 discloses compounds having the structure

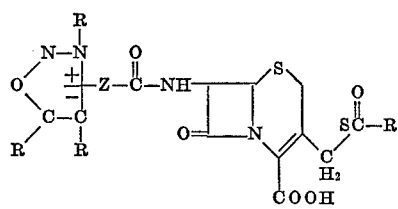

in which R represents methyl, thienyl, pyridyl, etc. and wherein general disclosure is made of other heterocyclic groups as at pages 1 and 2.

Equivalents are Netherlands 671488 (Farmdoc 31,936) and U.S. 3,530,123.

(14) Fujisawa's Belgian 714,518 (Farmdoc 35,307) discloses (among many others) compounds having the structure

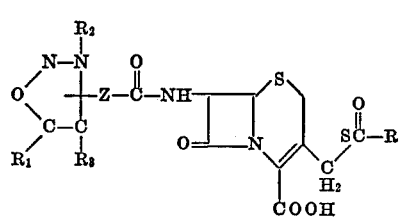

wherein R is as (13) above.

Equivalents are Netherlands 6806129 and South African 68/2,695.

(15) Glaxo's U.S. 3,243,435 and Belgian 650,444 (Farmdoc 15,535) disclose generally a vast variety of compounds having the structure

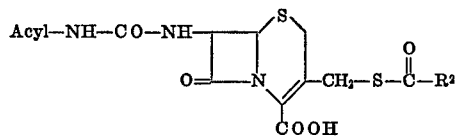

wherein $R^2$, is defined, e.g. in cols. 1 and 4, to include various heterocyclic groups.

(16) Ciba's South African 65/6,950 (Farmdoc 22,192) discloses compounds having the structure

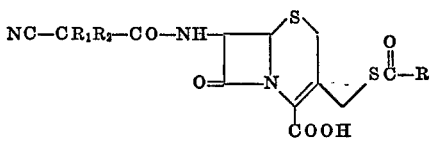

in which R in Example 20 is phenyl. Equivalents are Great Britain 1,109,525 and Canadian 807,651.

(17) Glaxo's U.S. 3,479,350 discloses a process for producing 3-pyridiniummethyl cephalosporins which utilizes as an intermediate compounds of the type described in references (2) and (3) above.

SUMMARY OF THE INVENTION

This invention comprises the compounds of the formula

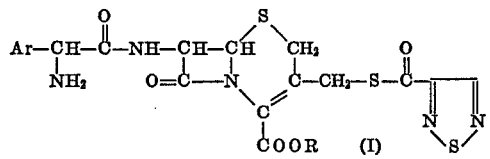

wherein Ar is phenyl, 2-thienyl or 3-thienyl and having the D configuration in the 7-sidechain and existing primarily as the zwitterion when R is hydrogen; wherein R is hydrogen, pivaloyloxymethyl, acetoxymethyl, methoxymethyl, acetonyl or phenacyl; and their nontoxic, pharmaceutically acceptable salts.

Such salts include the nontoxic, carboxylic acid salts thereof when R is hydrogen, including nontoxic metallic salts such as sodium, potassium, calcium and aluminum, the ammonium salt and substituted ammonium salts, e.g. salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N' - bis-dehydroabietylethylenediamine, N-(lower)-alkylpiperidine, e.g., N-ethylpiperidine, and other amines which have been used to form salts with benzylpenicillin; and in all cases the nontoxic acid addition salts thereof (i.e., the amine salts) including the mineral acid addition salts such as the hydrochloride, hydrobromide, hydroiodide, sulfate, sulfamate and phosphate and the organic acid addition salts such as the maleate, acetate, citrate, oxalate, succinate, benzoate, tartrate, fumarate, malate, mandelate, ascorbate and the like.

The compounds of the present invention are prepared according to the present invention by coupling with 7-amino-3-(1,2,5-thiadiazol - 3-yl)carbonyl thiomethyl-3-cephem-4-carboxylic acid (II) (or a salt or easily hydrolyzed ester thereof including those of U.S. Pat. 3,284,451 and U.K. 1,229,453 and any of the silyl esters described in U.S. Pat. 3,249,622 for use with 7-aminopenicillanic acid and used in Great Britain 1,073,530) a particular acid or its functional equivalent as an acylating agent for a primary amino group. After coupling, the blocking group is removed to give the desired product. Said acid has the formula

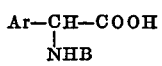

wherein Ar represents phenyl, 2-thienyl or 3-thienyl and wherein B represents a blocking group of the type used either in peptide syntheses or in any of the numerous syntheses of α-aminobenzylpencillin from 2-phenylglycine. Particularly valuable blocking groups are a proton, as in the compound of the formula

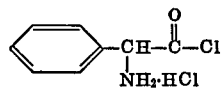

or a β-diketone as in Great Britain 1,123,333, e.g., methyl acetoacetate, in which case the acid containing the blocked amino group is preferably converted to a mixed anhydride, as with ethyl chloroformate, before reaction with compound II or a salt thereof to form the desired product I after acid cleavage.

Further to the discussion above of blocking groups used on the free amino group of the sidechain acid during its coupling with compound II, the blocking group is then removed to form the products of the present invention, e.g., the t-butoxy-carbonyl group is removed by treatment with formic acid, the carbobenzyloxy group is removed by catalytic hydrogenation, the 2-hydroxy-1-naphthcarbonyl group is removed by acid hydrolysis and the trichloroethoxycarbonyl group by treatment with zinc dust in glacial acetic acid. Obviously other functionally equivalent blocking groups for an amino group can be used and such groups are considered within the scope of this invention.

Thus, with respect to said acid to be used to couple with compound II, functional equivalents include the corresponding acid anhydrides, including mixed anhydrides and particularly the mixed anhydrides prepared from stronger acids such as the lower aliphatic monoesters of carbonic acid, or alkyl and aryl sulfonic acids and of more hindered acids such as diphenylacetic acid. In addition, an acid azide or an active ester or thioester (e.g., with p-nitrophenol, 2,4-dinitrophenol, thiophenol, thioacetic acid) may be used or the free acid itself may be coupled with compound II after first reacting said free acid with N,N'-dimethylchloroformiminium chloride [cf. Great Britain 1,008,170 and Novak and Weichet, Experientia XXI, 6, 360 (1965)] or by the use of enzymes or of an N,N'-carbonyldiimidazole or an N,N'-carbonyldi- triazole [cf. South African patent specification 63/2,684] or a carbodiimide reagent [especially N,N'-dicyclohexyl- carbodiimide, N,N'-diisopropylcarbodiimide or N-cyclo- hexyl-N'-(2-morpholinoethyl)carbodiimide; cf. Sheehan and Hess, J. Amer. Chem. Soc., 77, 1067 (1955)], or of alkylylamine reagent [cf. R. Buijle and H. G. Viehe, Angew. Chem. International, edition 3, 582 (1964)], or of a ketenimine reagent [cf. C. L. Stevens and M. E. Mond, J. Amer. Chem. Soc., 80 (4065)] or of an isoxazolium salt reagent [cf. R. B. Woodward, R. A. Olofson and H. Mayer, J. Amer. Chem. Soc., 83, 1010 (1961)]. Another equivalent of the acid chloride is a corresponding azolide, i.e., an amide of the corresponding acid whose amide nitrogen is a member of an quasiaromatic five-membered ring containing at least two nitrogen atoms, i.e., imidazole, pyrazole, the triazoles, benzimidazole, benzotriazoles and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield dimidazolide. The by-product, imidazole, precipitates and may be separated and the imidazolide isolated, but this is not essential. The methods for carrying out these reactions to produce a cephalosporin and the methods used to isolate the cephalosporin so produced are well known in the art.

In the treatment of bacterial infections in man, the compounds of this invention are administered orally or parenterally, in accordance with conventional procedures for antibiotic administration, in an amount of from about 5 to 200 mg./kg./day and preferably about 5 to 20 mg./kg./day in divided dosage, e.g., three to four times a day. They are administered in dosage units containing, for example, 125 or 250 or 500 mg. of active ingredient with suitable physiologically acceptable carriers or excipients. The dosage units are in the form of liquid preparations such as solutions or suspensions or as solids in tablets or capsules.

The preferred esters of the cephalosporins of the present invention are the pivaloyloxymethyl, acetoxymethyl, methoxymethyl, acetonyl and phenacyl esters. All are useful intermediates in the production of the cephalosporin having a free carboxyl group and the first three are also of interest because on oral administration they provide different rates and amounts of absorption and give differing concentrations of the active antibacterial agent in blood and tissues.

As indicated above, these five esters of 7-aminocephalosporanic acid are each prepared by known methods. One excellent procedure is that of U.S. at. No. 3,284,451 in which sodium cephalothin is esterified by reaction with the corresponding active chloro or bromo compound (e.g. phenacyl bromide, chloroacetone, chloromethyl ether, pivaloyloxymethyl chloride [also called chloromethyl pivalate], acetoxymethyl chloride) and then the thienylacetic acid sidechain is removed enzymatically as in the same patent or chemically as in U.S. Pat. No. 3,575,970 and in Journal of Antibiotics, XXIV (11), 767–773 (1971). In another good method the triethylamine salt of 7-aminocephalosporanic acid is reacted directly with the active halogen compound, as in U.K. 1,229,453.

These esters of 7-aminocephalosporanic acid are then reacted with the nucleophile in the same manner as is illustrated herein for 7-aminocephalosporanic acid itself. The 3-thiolated ester of 7-aminocephalosporanic acid is then coupled with the 2-arylglycine, e.g. D-(—)-2-phenylglycine, as before. Before or after removal of any blocking group on the α-amino group of the 2-arylglycine sidechain, the ester of the cephalosporin so obtained is, if not used per se, converted to its free acid, including its zwitterion (and, if desired, any salt) by removal of the esterifying group, as by aqueous or enzymatic hydrolysis (as with human or animal serum) or acidic or alkaline hydrolysis or by treatment with sodium thiophenoxide as taught in U.S. 3,284,451 and, in the penicillin series, by Sheehan et al., J. Org. Chem., 29(7), 2006–2008 (1964).

In another alternative synthesis, the 3-thiolated 7-amino-cephalosporanic acid is prepared as described herein and then acylated at the 7-amino group and finally esterified, as by reaction of the appropriate alcohol with the acid chloride prepared, for example, by reaction of the final cephalosporin with thionyl chloride or by other essentially acidic esterification procedures.

The preferred and most active compounds of the present invention are those having the D configuration at the α-carbon atom in the 7-sidechain, that is, those made from D-(—)-2-phenylglycine, which is also called D-(—)-α-amino-phenylacetic acid, and D-(—)-2-thienylglycine and D-(—)-3-thienylglycine. In addition, the configuration at the two optically active, asymmetric centers in the β-lactam nucleus is that found in cephalosporin C produced by fermentation and in the 7-aminocephalosporanic acid derived therefrom.

1,2,5-thiadiazole-3-carboxylic thioacid

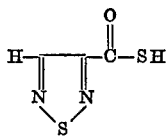

A solution of 25 g. (~0.25 mole) of NaSH·XH$_2$O (Fisher) in 300 ml. of 90% ethanol-water was filtered and cooled to 8° C. and with vigorous stirring, a solution of 12 g. 1,2,5-thiadiazole-3-carbonyl chloride (prepared according to U.S. Pat. 3,322,749) in 50 ml. of dry ether was added dropwise. After stirring for 30 min., the ethanol was removed under reduced pressure at 20° C. and 50 ml. of cold water added. To this solution, 100 ml. of methylene chloride was added and, with cooling and stirring, the mixture was acidified to pH 2 with 6 NHCl. The CH$_2$Cl$_2$ extract was dried briefly (10 min.) over Na$_2$SO$_4$, filtered and evaporated to dryness under reduced pressure to leave a mixture of oil and crystals. The crude 1,2,5-thiadiazole-3-carboxylic thioacid was used as is for the next step; yield 14 g.

7-amino-3-(1,2,5-thiadiazol-3-yl)carbonylthiomethyl-3-cephem-4-carboxylic acid

To a stirred suspension of 13.6 g. (0.05 mole) of 7-ACA in 200 ml. of 0.1 M, pH 6.4 phosphate buffer was added 8.4 g. (0.1 mole) of NaHCO$_3$ followed by the 14 g. of 1,2,5-thiadiazol-3-carboxylic thioacid and the mixture heated at 52° C. for 3½ hours. The solids were then collected by filtration, washed well with water and then acetone and air dried. The yield, after vacuum drying at room temperature over P$_2$O$_5$ for 18 hours, was 9.2 g. of 7-amino-3-(1,2,5-thiadiazol-3-yl)carbonylthiomethyl-3-cephem-4-carboxylic acid; dec. pt. 196° C. The IR and NMR spectra were consistent with the desired structure.

Analysis.—Calcd. for C$_{11}$H$_{10}$N$_4$O$_4$S$_3$ (percent): C, 36.86; H, 2.82; N, 15.64. Found (percent): C, 35.55; H, 2.93; N, 14.52.

Pivaloyloxymethyl 7-amino-3-(1,2,5-thiadiazol-3-yl)-carbonylthiomethyl-3-cephem-4-carboxylate Method A.—The title compound is produced by substituting for the 7-aminocephalosporanic acid used immediately above an equimolar weight of pivaloyloxymethyl 7-aminocephalosporanate hydrochloride prepared according to Example 2 of U.K. 1,229,453 from 7-aminocephalosporanic acid. German 1,904,585 (Farmdoc 39,445) is equivalent to U.K. 1,229,453.

Method B.—The title compound is produced by substituting for the 0.025 mole (6.8 g.) 7-aminocephalosporanic acid used in the procedure of Example 2 of U.K. 1,229,453 an equimolar weight of 7-amino-3-(1,2,5-thiadiazol-3-yl)carbonylthiomethyl-3-cephem-4-carboxylic acid.

The respective acetoxymethyl, methoxymethyl, acetonyl and phenacyl esters of 7-amino-3-(1,2,5-thiadiazol-3-yl)-carbonylthiomethyl-3-cephem-4-carboxylic acid are prepared by substituting in Method B above for the chloromethyl pivalate used therein an equimolar weight of chloromethylacetate, chloromethyl methyl ether, chloroacetone and phenacyl bromide, respectively.

Acetoxymethyl 7-amino-3-(1,2,5-thiadiazol-3-yl)-carbonylthiomethyl-3-cephem-4-carboxylate The title compound is produced by substituting for the 7-aminocephalosporanic acid used above (in the reaction with 1,2,5-thiadiazol-3-thiocarboxylic acid) an equimolar weight of acetoxymethyl 7-aminocephalosporanate hydrochloride prepared according to Binderup et al., Journal of Antibiotics, XXIV (11), 767–773 (November 1971).

In a similar fashion the respective pivaloyloxymethyl, methoxymethyl, acetonyl and phenacyl esters of 7-aminocephalosporanic acid are prepared (as hydrochlorides) by replacing the chloromethyl acetate in the procedure of Binderup et al., ibid., with equimolar weights of chloromethyl pivalate, chloromethyl methyl ether, chloroacetone and phenacyl bromide, respectively. Each of these hydrochloride esters of 7-ACA is then reacted as was the acetoxymethyl ester hydrochloride to produce the corresponding ester of 7-amino-3-(1,2,5-thiadiazol-3-yl)-carbonylthiomethyl-3-cephem-4-carboxylic acid.

The following examples are given in illustration of, but not in limitation of, the present invention. All temperatures are given in degrees centigrade. 7-aminocephalosporanic acid is abbreviated as 7-ACA and methyl isobutyl ketone as MIBK. "Skellysolve B" is a petroleum ether fraction of B.P. 60–68° C. consisting essentially of n-hexane.

EXAMPLE 1

7-[D-α-amino-α-phenylacetamido]-3-(1,2,5-thiadiazole-3-yl)-carbonylthiomethyl-3-cephem-4-carboxylic acid To a stirred suspension of 7.16 g. (0.02 mole) of 7-amino - 3 - (1,2,5-thiadiazol-3-yl)carbonylthiomethyl-3-cephem-4-carboxylic acid in 100 ml. of CH$_2$Cl$_2$ was added 5.2 ml. (0.037 mole) of triethylamine and 3 ml. (~.03 mole) of N,N-dimethylaniline and the mixture cooled to 5° C. and 5.08 ml. 0.04 mole) of chlorotrimethyl silane added dropwise over a 10 min. period. Next, the mixture was refluxed for 30 min., cooled and 4.36 g. (0.02 mole) of D-(—)-α-phenylglycine acid chloride hydrochloride was added. The mixture was stirred at 10° C. for 2½ hrs. and then 100 ml. of water was added with vigorous stirring. The pH was then adjusted to 2 with 20% NaOH and the solids collected by filtration, washed with a little water and air dried. These solids were then suspended in 200 ml. of 1:1 methanol-water and the pH adjusted to 1.5 with 6 N HCl. Next, 5 g. of decolorizing carbon ("Darko-KB") was added and, after 10 min., the mixture was filtered and the pH of the filtrate adjusted to 4 with 20% NaOH. The methanol was then removed in vacuo at 20° C. and the white precipitate collected by filtration, washed with water, then acetone and air dried. After vacuum drying at room temperature over P$_2$O$_5$, there was obtained 1.6 g. of 7-[D-α-amino-α-phenylacetamido]-3-(1,2,5 - thiadiazole-3-yl)carbonylthiomethyl-3-cephem-4-carboxylic acid, dec. pt. 174° C. The IR and NMR spectra were consistent with the desired structure.

Analysis.—Calcd. for C$_{19}$H$_{17}$N$_5$O$_5$S$_3$·½H$_2$O (percent): C, 45.60; H, 3.62; N, 13.99. Found (percent): C. 45.28: H, 3.76; N, 13.65.

This sample of 7-[D - α - aminophenylacetamido]-3-(1,2,5-thiadiazole-3-yl)carbonylthiomethyl - 3 - cephem-4-carboxylic acid (called new compound) after solution in DMSO (dimethyl sulfoxide) at 14 mgm./ml. followed by dilution with nutrient broth was found to exhibit the following minimum inhibitory concentrations (M.I.C.) in mcg./ml. versus the indicated microorganisms as determined by overnight incubation at 37° C. by tube dilution. Two old, orally absorbed cephalosporins were included.

TABLE 1

M.I.C. in mcg./ml.

| Organism | New cpd. | Cepha-lexin | Cephalo-glycin |
|---|---|---|---|
| D. pneumoniae plus 5% serum[1] A9585 | .16 | .16 | .06 |
| Str. pyogenes plus 5% serum[1] A9604 | .3 | .16 | .06 |
| S. aureus Smith[2] A9537 | .3 | .6 | .06 |
| S. aureus Smith[2] plus 50% serum A9537 | 32 | 1.3 | 1.3 |
| S. aureus BX1633-2 at 10⁻³ dil'n  A9606 | .6 | 4 | 1.3 |
| S. aureus BX1633-2 at 10⁻² dil'n  A9606 | 2 | 8 | 2.5 |
| S. aureus meth.-resist; at 10⁻³ dil'n A15097 | 4 | 16 | 4 |
| S. aureus at 10⁻³ dil'n A9748 | 4 | 16 | 8 |
| S. aureus at 10⁻² dil'n A9748 | 16 | 63 | 8 |
| Sal. enteritidis[2] A9531 | .16 | 2 | .3 |
| E. coli Juhl[2] A15119 | 4 | 8 | 1 |
| E. coli[2] A9675 | 16 | 16 | 4 |
| K. pneumoniae[2] A9977 | 4 | 4 | .6 |
| K. pneumoniae[2] A15130 | 16 | 16 | 2 |
| Pr. mirabilis[2] A9900 | 2 | 4 | .6 |
| Pr. morganii[2] A15153 | 63 | >125 | 63 |
| Ps. aeruginosa[2] A9843A | >125 | >125 | >125 |
| Ser marcescens[2] A20019 | 125 | >125 | >125 |

[1] 50% nutrient broth–45% antibiotic assay broth.
[2] At 10⁻⁴ dilution.

Blood levels in the mouse after oral administration were determined with the following results:

| R= | Dose, mgm./kg. | Blood level in mcg./ml. | | | |
|---|---|---|---|---|---|
| | | Hours after administration | | | |
| | | 0.5 | 1 | 2 | 3.5 |
| 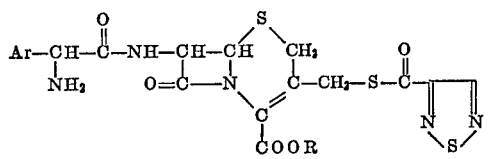 | 100 | 17.0 | 13.1 | 5.5 | 2.4 |
| —H (cephalexin)-monohydrate | 100 | 36.4 | 18.5 | 2.5 | 0.4 |

EXAMPLE 2

Sodium 7-[D-(α-amino-α-phenylacetamido)] - 3 - (1,2,5-thiadiazol-3-yl) - carbonylthiomethyl - 3 - cephem - 4-carboxylate To a stirred aqueous suspension of the zwitterionic form of 7-[D-(α-amino-α-phenylacetamido)] - 3 - (1,2,5-thiadiazol-3-yl)carbonylthiomethyl - 3 -cephem - 4 - carboxylic acid (0.8 mmole) is added 1 N aqueous sodium hydroxide at room temperature until a clear solution (pH 10.8) is obtained. This solution is immediately freeze-dried to give impure, solid sodium 7-[D-(α-amino-α-phenylacetamido)]-3-(1,2,5-thiadiazol - 3 - yl)carbonyl-thiomethyl-3-cephem-4-carboxylate.

EXAMPLE 3

7 - [D-α-amino-α-(3 - thienyl)-acetamido] - 3 - (1,2,5-thiadiazol - 3 - yl)carbonylthiomethyl - 3 - cephem-4-carboxylic acid This compound is prepared by substituting an equimolar weight of D-(—)-α-amino-α-(3-thienyl)-acetyl chloride hydrochloride in the procedure of Example 1 for the D-(—)-α-amino-α-phenylacetyl chloride hydrochloride used therein.

EXAMPLE 4

7 - [D-α-amino-α-(2 - thienyl)-acetamido] - 3 - (1,2,5-thiadiazol - 3 - yl)carbonylthiomethyl - 3 - cephem-4-carboxylic acid Following the exact same procedure as in Example 1 except using an equimolar weight of D-(—)-α-amino-α-(2-thienyl)-acetylchloride hydrochloride in place of the D-(—)-2-phenylglycyl chloride hydrochloride used therein gives this compound.

EXAMPLE 5

Acetoxymethyl 7 - [D-α-aminophenylacetamido]-3-(1,2,5-thiadiazol - 3 - yl)carbonylthiomethyl - 3 - cephem-4-carboxylate To a solution of acetoxymethyl 7-amino-3-(1,2,5-thiadiazol - 3 - yl)carbonylthiomethyl - 3 - cephem - 4-carboxylate (regenerated from 0.009 mole of its hydrochloride) in 30 ml. ethyl acetate is added 0.020 mole pyridine. The mixture is cooled in ice and stirred while 0.010 mole D-(—)-2-phenylglycine chloride hydrochloride in 30 ml. ethyl acetate is added over ten minutes. After a further twenty minutes in the cold, stirring is continued at room temperature for one hour. Then the mixture is washed successively with aqueous sodium bicarbonate, 0.1 N hydrochloric acid and water, dried and evaporated in vacuo to leave the desired acetoxymethyl 7 - (D-α-aminophenylacetamido) - 3 - (1,2,5-thiadiazol-3-yl)carbonylthiomethyl-3-cephem-4-carboxylate as an oil which crystallizes on trituration in cyclohexane.

The respective pivaloyloxymethyl, methoxymethyl, acetonyl, and phenacyl esters corresponding to the above acetoxymethyl ester are produced by replacing the acetoxymethyl 7 - amino - 3 - (1,2,5 - thiadiazol-3-yl)carbonyl-thiomethyl - 3 - cephem - 4 - carboxylate hydrochloride used in the above procedure with 0.009 mole of the hydrochloride of pivaloyloxymethyl, methoxymethyl, acetonyl and phenacyl esters of 7 - amino-3-(1,2,5-thiadiazol-3 - yl)carbonylthiomethyl - 3 - cephem - 4 - carboxylic acid, respectively.

We claim:

1. A compound having the D configuration in the 7-sidechain and the formula

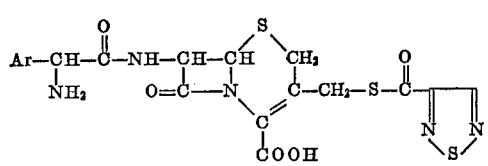

wherein Ar is phenyl, 2-thienyl or 3-thienyl; R is hydrogen, pivaloyloxymethyl, acetoxymethyl, methoxymethyl, acetonyl or phenacyl; or a nontoxic, pharmacetuically acceptable salt thereof.

2. An acid having the D configuration in the 7-sidechain and the formula wherein Ar is phenyl, 2-thienyl or 3-thienyl.

3. The sodium salt of a compound of claim 2.
4. The potassium salt of a compound of claim 2.
5. The zwitterion form of a compound of claim 2.

6. A nontoxic, pharmaceutically acceptable acid addition salt of a compound of claim 2.
7. The pivaloyloxymethyl ester of an acid of claim 2.
8. The acetoxymethyl ester of an acid of claim 2.
9. The methoxymethyl ester of an acid of claim 2.
10. The acetonyl ester of an acid of claim 2.
11. The phenacyl ester of an acid of claim 2.
12. A compound of claim 1 having the D configuration in the 7-sidechain and the formula

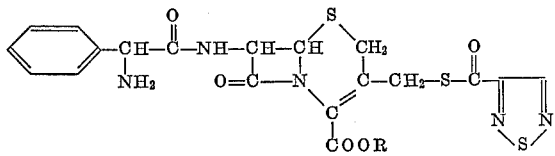

wherein R is hydrogen, pivaloyloxymethyl, acetoxymethyl, methoxymethyl, acetonyl or phenacyl; or a nontoxic, pharmaceutically acceptable salt thereof.

13. The acid of claim 2 having the D configuration in the 7-sidechain and the formula

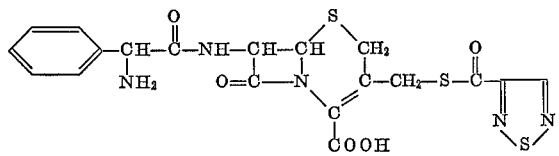

14. The sodium salt of the compound of claim 13.
15. The potassium salt of the compound of claim 13.
16. The zwitterion form of the compound of claim 13.
17. A nontoxic, pharmaceutically acceptable acid addition salt of the compound of claim 13.
18. The pivaloyloxymethyl ester of the acid of claim 13.
19. The acetoxymethyl ester of the acid of claim 13.
20. The methoxymethyl ester of the acid of claim 13.
21. The acetonyl ester of the acid of claim 13.
22. The phenacyl ester of the acid of claim 13.
23. A compound of claim 1 having the D configuration in the 7-sidechain and the formula

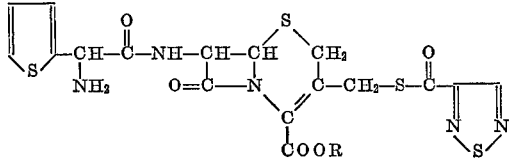

wherein R is hydrogen, pivaloyloxymethyl, acetoxymethyl, methoxymethyl, acetonyl or phenacyl; or a nontoxic, pharmaceutically acceptable salt thereof.

24. The acid of claim 2 having the D configuration in the 7-sidechain and the formula

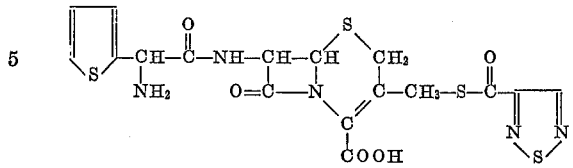

25. The sodium salt of the compound of claim 24.
26. The potassium salt of the compound of claim 24.
27. The zwitterion form of the compound of claim 24.
28. A nontoxic, pharmaceutically acceptable acid addition salt of the compound of claim 24.
29. The pivaloyloxymethyl ester of the acid of claim 24.
30. The acetoxymethyl ester of the acid of claim 24.
31. The methoxymethyl ester of the acid of claim 24.
32. The acetonyl ester of the acid of claim 24.
33. The phenacyl ester of the acid of claim 24.
34. A compound of claim 1 having the D configuration in the 7-sidechain and the formula

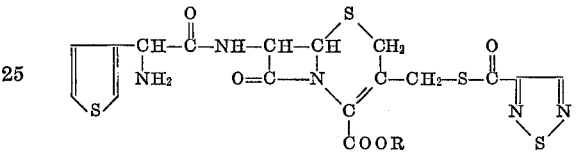

wherein R is hydrogen, pivaloyloxymethyl, acetoxymethyl, methoxymethyl, acetonyl or phenacyl; or a nontoxic, pharmaceutically acceptable salt thereof.

35. The acid of claim 2 having the D configuration in the 7-sidechain and the formula

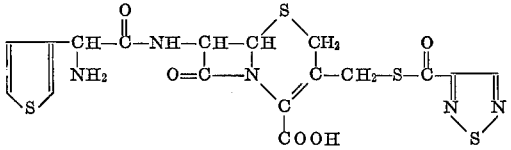

36. The sodium salt of the compound of claim 35.
37. The potassium salt of the compound of claim 35.
38. The zwitterion form of the compound of claim 35.
39. A nontoxic, pharmaceutically acceptable acid addition salt of the compound of claim 35.
40. The pivaloyloxymethyl ester of the acid of claim 35.
41. The acetoxymethyl ester of the acid of claim 35.
42. The methoxymethyl ester of the acid of claim 35.
43. The acetonyl ester of the acid of claim 35.
44. The phenacyl ester of the acid of claim 35.

References Cited
UNITED STATES PATENTS
3,641,021   2/1972   Ryan _____ 260—239.1

NICHOLAS S. RIZZO, Primary Examiner

U.S. Cl. X.R.
424—246